Aug. 30, 1938.  W. F. MERRITT  2,128,467
DETACHABLE LINING FOR BRAKE SHOES
Filed June 3, 1937
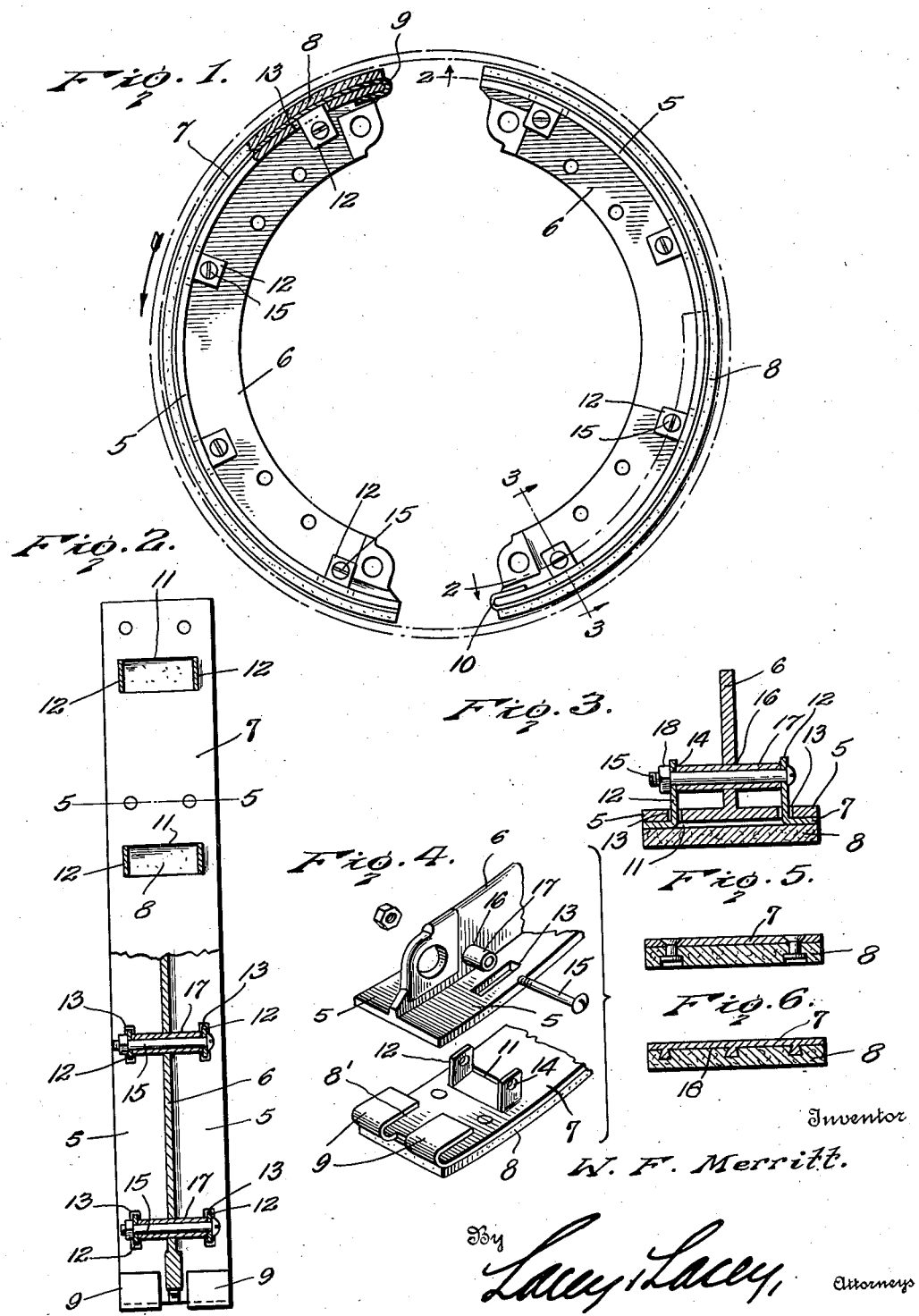
Inventor
W. F. Merritt.
By Lacey & Lacey, Attorneys Patented Aug. 30, 1938

2,128,467

UNITED STATES PATENT OFFICE 2,128,467

DETACHABLE LINING FOR BRAKE SHOES

William F. Merritt, Livingston, N. J.

Application June 3, 1937, Serial No. 146,255

3 Claims. (Cl. 188—242)

This invention relates to brake shoes and more particularly to a detachable lining for the brake shoes of automobiles and other vehicles.

The object of the invention is to provide a brake shoe lining of simple and inexpensive construction which may be quickly applied to or removed from the brake shoe without the necessity of detaching the shoe from the brake or in any manner disturbing the brake-operating mechanism.

A further object of the invention is to provide a detachable lining comprising arcuate members or plates adapted to receive the brake lining and provided with terminal hooks extending in opposite directions for engagement with the brake shoe thereby to assist in preventing creeping of the lining on said brake shoe.

A further object is to provide the lining carrying members or plates with lateral attaching lugs which extend through slots in the brake shoe for engagement with suitable fastening devices so that by releasing the fastening devices the plates with the lining thereon can be removed as a unit from the brake shoe.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation, partly in section, of a brake shoe and detachable brake shoe lining embodying the present invention, Figure 2 is a sectional view taken on the line 2—2 of Figure 1 and looking in the direction of the arrows, Figure 3 is a transverse sectional view taken on the line 3—3 of Figure 1, Figure 4 is a perspective view of one end of the brake shoe and the adjacent end of the lining carrying member, the parts being separated in order to show how they are assembled, Figure 5 is a transverse sectional view taken on the line 5—5 of Figure 2, and Figure 6 is a similar view illustrating a modified form of the invention.

The improved detachable lining forming the subject-matter of the present invention is principally designed for use on the brake shoes of automobiles and similar vehicles, and by way of illustration is shown applied to a brake shoe of standard construction, in which 5 designates a pair of coacting brake shoes each provided with an inwardly extending reinforcing web 6. The device comprises arcuate members or plates 7 to which are riveted or otherwise permanently secured strips of suitable brake lining, indicated at 8. The end of the metal forming one of the arcuate plates 7 is slotted longitudinally at 8' and the metal on each side of the slot 8' bent downwardly and inwardly to form spaced overhanging hooks 9 adapted to fit over the end of one of the brake shoes 5 while the metal constituting the other plate 7 is cut and bent in a like manner to form similar spaced hooks 10 for engagement with the other brake shoe. It will here be noted that the hooks 9 and 10 extend in opposite directions so as to assist in preventing creeping of the lining on the brake shoes when the device is in use. The material comprising each arcuate plate 7 is provided at predetermined intervals with spaced incisions 11 and the metal between the incisions 11 is pressed outwardly to form laterally extending attaching lugs 12 which pass through correspondingly shaped slots 13 formed in the adjacent brake shoe and are provided with terminal openings 14 for the reception of bolts or similar fastening devices 15. The webs 6 of the brake shoes at the slots 13 are formed with transverse openings 16 in which are fitted tubular members or spacing sleeves 17 which bear against the inner faces of the lateral lugs 12 so as to permit tightening of the clamping nuts 18 without bending or distorting said lugs.

It will here be noted that, inasmuch as the brake lining 8 is secured to the arcuate plates 7, said plates together with the lining may be secured to or removed from the brake shoes 6 as a unit. These arcuate plates 7 with the lining secured thereto may be kept in stock so that, if it is necessary to renew or replace the brake lining of an automobile or other vehicle, it is merely necessary to remove the old brake lining and position a set of plates 7 equipped with a new lining on the adjacent shoes 5 with the hooks 9 and 10 engaging the brake shoes on opposite sides of the webs 6 and then pass the lateral lugs 12 through the slots 13 in said brake shoes and secure the parts together by means of the bolts 15. It will thus be seen that the plates 7 with the lining thereon may be secured to or removed from the brake shoe as a unit without the necessity of detaching the shoe from the brake or in any manner disturbing the brake-operating mechanism.

If desired, instead of having the lining riveted to the arcuate plates 7, the outer surfaces of the plates 7 may be roughened or provided with depressions 18 and the brake lining molded directly on the plates 7 and in which event the depressions 18 will receive the material of which the brake lining is formed and tend to securely bond or anchor the parts together. It will, of course, be understood that any desired number of lateral attaching lugs may be employed and various changes in shape, size and proportions of the device may be made without departing from the spirit of the invention.

Having thus described the invention, what is claimed as new is:

1. The combination with coacting brake shoes having inwardly projecting reinforcing ribs formed with spaced perforations, of a detachable lining comprising companion arcuate plates having means for engagement with the brake shoes and provided with laterally extending lugs, and fastening devices extending through the lugs and perforations in the reinforcing ribs.

2. The combination with coacting brake shoes having spaced slots formed therein and each provided with an inwardly extending perforated reinforcing rib, of a detachable lining comprising coacting arcuate plates having means for engagement with the adjacent brake shoes and provided with laterally extending lugs projecting through the slots in the brake shoes, securing bolts extending through the lugs and the adjacent perforations in the reinforcing ribs, and spacing members surrounding the securing bolts and bearing against the inner faces of the lugs.

3. The combination with coacting brake shoes having spaced slots formed therein and each provided with an inwardly extending reinforcing rib, of a detachable lining comprising arcuate plates each having one end thereof provided with a terminal hook for engagement with the adjacent brake shoe and formed intermediate their ends with spaced incisions defining laterally extending securing lugs projecting through the slots in the brake shoes on opposite sides of the adjacent reinforcing rib, securing bolts extending through the lugs and perforations in the reinforcing ribs, and spacing sleeves surrounding the securing bolts and bearing against the lugs.

WILLIAM F. MERRITT.